(12) United States Patent
Golembeski et al.

(10) Patent No.: US 9,926,022 B1
(45) Date of Patent: Mar. 27, 2018

(54) AIRFLOW MANAGEMENT COVER

(71) Applicant: GM GLOBAL TECHNOLOGY OPERATIONS LLC, Detroit, MI (US)

(72) Inventors: Adam Golembeski, Royal Oak, MI (US); Jason W. Guenzel, Milford, MI (US); Christopher T. Koh, Detroit, MI (US); Luis Enrique Patino Ramirez, Toluca (MX); Jean-Michel T. Su, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/361,847

(22) Filed: Nov. 28, 2016

(51) Int. Cl.
*B62D 35/02* (2006.01)
*B60K 11/08* (2006.01)

(52) U.S. Cl.
CPC .............. *B62D 35/02* (2013.01); *B60K 11/08* (2013.01)

(58) Field of Classification Search
CPC ...... B62D 35/02; B62D 35/005; B62K 11/08; B62K 13/04; B62K 11/00
See application file for complete search history.

(56) References Cited

U.S. PATENT DOCUMENTS

| | | | | |
|---|---|---|---|---|
| 6,203,095 B1* | 3/2001 | Peterson | .................. | B60J 11/00 293/128 |
| 6,622,807 B2* | 9/2003 | Preiss | .................. | B62D 35/005 165/44 |
| 7,073,840 B1* | 7/2006 | Colmenero | .............. | B60J 11/06 150/166 |
| 7,275,611 B2* | 10/2007 | Rijsbergen | ............. | B62D 35/02 180/68.1 |
| 8,544,583 B2* | 10/2013 | Ajisaka | .................. | B60K 11/08 180/68.1 |
| 8,668,254 B2* | 3/2014 | Onodera | ................ | B62D 35/02 180/69.1 |
| 8,882,176 B2* | 11/2014 | Froling | .................. | B62D 35/02 296/180.1 |
| 8,887,845 B2* | 11/2014 | McDonald | ........... | B62D 35/005 180/68.1 |
| 9,227,677 B2* | 1/2016 | Hillstroem | ............. | B60K 13/04 |
| 9,327,780 B1* | 5/2016 | Bird | ...................... | B60R 19/023 |
| 2009/0115221 A1* | 5/2009 | Shinedling | ............. | B62D 37/02 296/180.5 |

(Continued)

*Primary Examiner* — Hau V Phan
(74) *Attorney, Agent, or Firm* — Quinn IP Law

(57) ABSTRACT

An airflow management cover for a vehicle subsystem arranged proximate a section of the vehicle to guide oncoming ambient airflow when the vehicle is in motion includes a convex body. The convex body has an exterior surface shaped to redirect an external portion of the oncoming ambient airflow around the vehicle subsystem to thereby minimize aerodynamic drag and reduce aerodynamic lift on the vehicle body. The airflow management cover also includes an aperture defined by the convex body and configured to exhaust a stream of a subsystem portion of the oncoming airflow to rejoin with the redirected external portion of the oncoming airflow after the subsystem portion of the airflow has passed across the subsystem. The airflow management cover additionally includes a fastening flange extending from the convex body and configured for mounting to the vehicle section. A vehicle having such an airflow management cover is also disclosed.

10 Claims, 3 Drawing Sheets

(56) References Cited

U.S. PATENT DOCUMENTS

| | | | | |
|---|---|---|---|---|
| 2012/0024611 A1* | 2/2012 | Ajisaka | ............... | B60K 11/08 |
| | | | | 180/68.1 |
| 2013/0026797 A1* | 1/2013 | Onodera | ............... | B62D 35/02 |
| | | | | 296/204 |
| 2013/0059519 A1* | 3/2013 | Tajima | ............... | B60K 11/04 |
| | | | | 454/152 |

* cited by examiner

AIRFLOW MANAGEMENT COVER

TECHNICAL FIELD

The disclosure relates to a cover for a vehicle subsystem configured to manage ambient airflow relative to the vehicle and reduce aerodynamic lift and aerodynamic drag of the vehicle body.

BACKGROUND

Aerodynamics is a study of objects moving through air and is a significant factor in vehicle design, including automobiles. Automotive aerodynamics is the study of the aerodynamics of road vehicles. The main goals of the study are reducing vehicle drag and wind noise, minimizing noise emission, as well as preventing undesired lift forces and other causes of aerodynamic instability during cornering and at high speeds via management of airflow. The study is typically used to shape vehicle bodywork and add-on aerodynamic devices for achieving a desired compromise among the above characteristics for specific vehicle use. Additionally, the study of aerodynamics may be used to generate appropriate airflow into the vehicle passenger compartment and/or provide cooling for various vehicle components and systems.

SUMMARY

An airflow management cover for a vehicle subsystem is arranged proximate a section of the vehicle to guide oncoming or incident ambient airflow when the vehicle is in motion. The airflow management cover includes a convex body. The convex body has an exterior surface shaped to redirect an external portion of the oncoming ambient airflow around the vehicle subsystem to thereby minimize aerodynamic drag and reduce aerodynamic lift on a body of the vehicle. The airflow management cover also includes at least one first aperture defined by the convex body. The at least one first aperture is configured to exhaust a first stream of a subsystem portion of the oncoming ambient airflow to rejoin with the redirected external portion of the oncoming airflow after the subsystem portion of the oncoming ambient airflow has passed across, such as over or through, the vehicle subsystem. The airflow management cover is also configured to manage the subsystem portion of the oncoming ambient airflow through the subsystem. The airflow management cover additionally includes a fastening flange extending from the convex body and configured to be mounted to the vehicle section.

The exterior surface of the convex body can include a leading section configured to face the oncoming ambient airflow and a trailing section having a step arranged orthogonal to the redirected external portion of the oncoming airflow. The exterior surface of the convex body can additionally have an airfoil shape.

The at least one first aperture can include a plurality of first apertures.

The exterior surface of the convex body can include a side section arranged along the oncoming ambient airflow. The side section can define at least one second aperture configured to exhaust a second stream of the subsystem portion of the oncoming airflow after the subsystem portion of the oncoming ambient airflow has passed across the vehicle subsystem.

The at least one second aperture can include a plurality of second apertures.

The vehicle subsystem can be one of a vehicle heat exchanger and a mechanism of a vehicle powertrain, or other devices of the vehicle that use oncoming or bypassing airflow for durable and reliable functionality.

Each of the convex body and the fastening flange can be constructed from a polymeric material.

The convex body and the fastening flange can form a single, continuous, in other words, monolithic structure.

The convex body can include a structural rib configured to enhance rigidity of the cover, as well as manage, i.e., deflect or redirect, external debris and fluids.

A vehicle employs the above-described airflow management cover is also disclosed. The subject vehicle includes a vehicle body configured to face an oncoming ambient airflow. The vehicle body includes a first vehicle body end, a second vehicle body end opposite of the first vehicle body end, and a vehicle underbody section configured to span a distance between the first and second vehicle body ends and receive an underbody portion of the oncoming ambient airflow when the vehicle is in motion.

For example, the noted vehicle subsystem can be arranged proximate the underbody section of the vehicle. The subject vehicle can then employ the above-described airflow management cover to shield the vehicle subsystem and guide the underbody and subsystem portions of the oncoming ambient airflow. In such an embodiment, the exterior surface of the convex body can redirect the vehicle underbody portion of the oncoming ambient airflow around the vehicle subsystem. Furthermore, in such a case, the first aperture(s) can be configured to exhaust the first stream of the subsystem portion of the oncoming ambient airflow to rejoin with the redirected underbody portion of the oncoming airflow.

A grille opening can be arranged at the first vehicle body end and configured to receive the subsystem portion of the oncoming ambient airflow.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
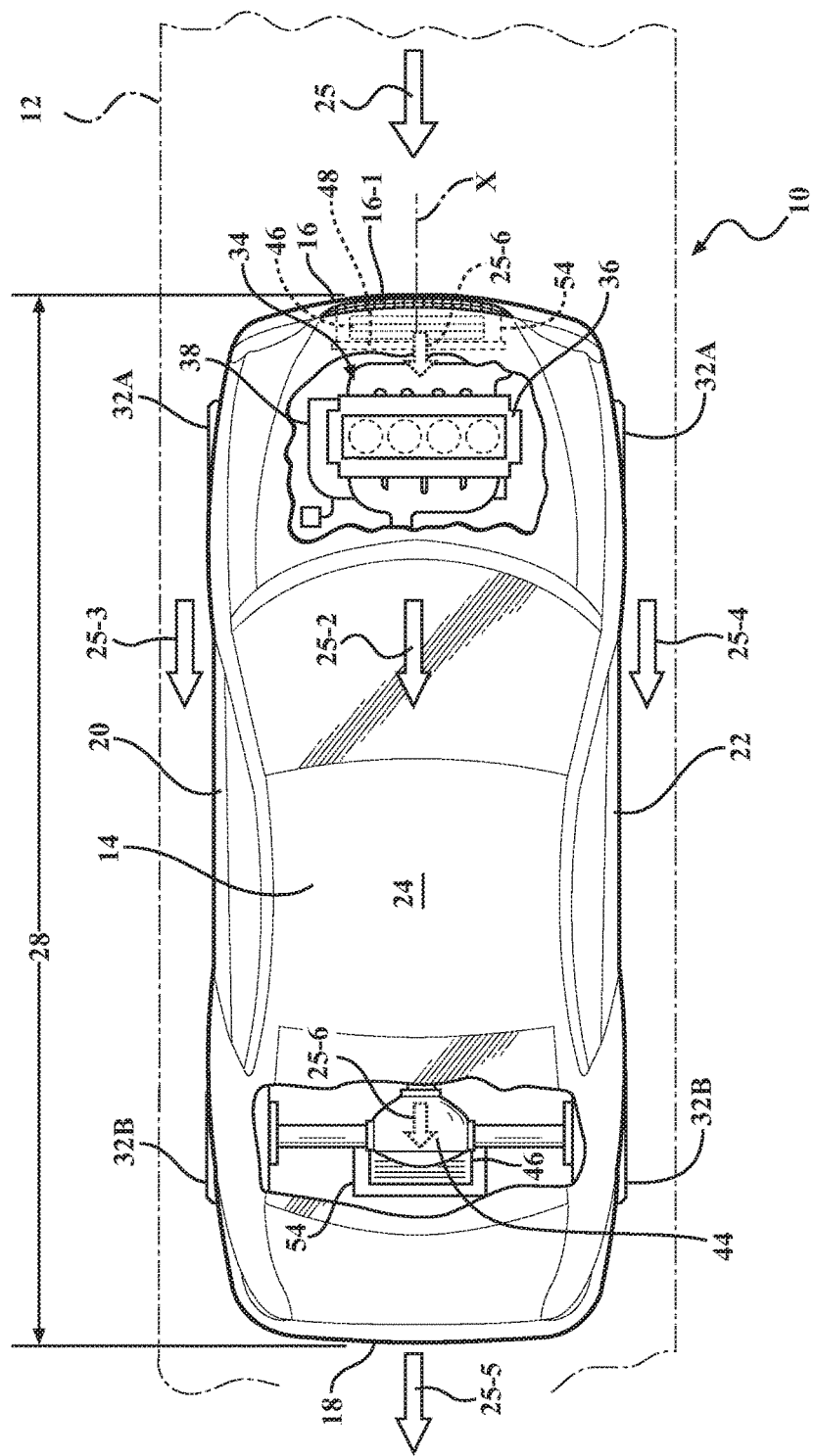
FIG. 1 is a schematic top view of a vehicle having various vehicle subsystems and portions of ambient airflow passing relative to the vehicle according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 having a longitudinal axis X. The vehicle body 14 defines six body sides. The six body sides include a first body end or front end 16, an opposing second body end or rear end 18, a left side or section 20, and a right side 22, a top body section 24, and an underbody section 26 (shown in FIG. 2). As understood by those skilled in the art, the front end 16 is configured to face oncoming or incident, i.e., approaching and contacting, ambient airflow 25, for example when the vehicle is in motion relative to the road surface 12.

Figure 4:
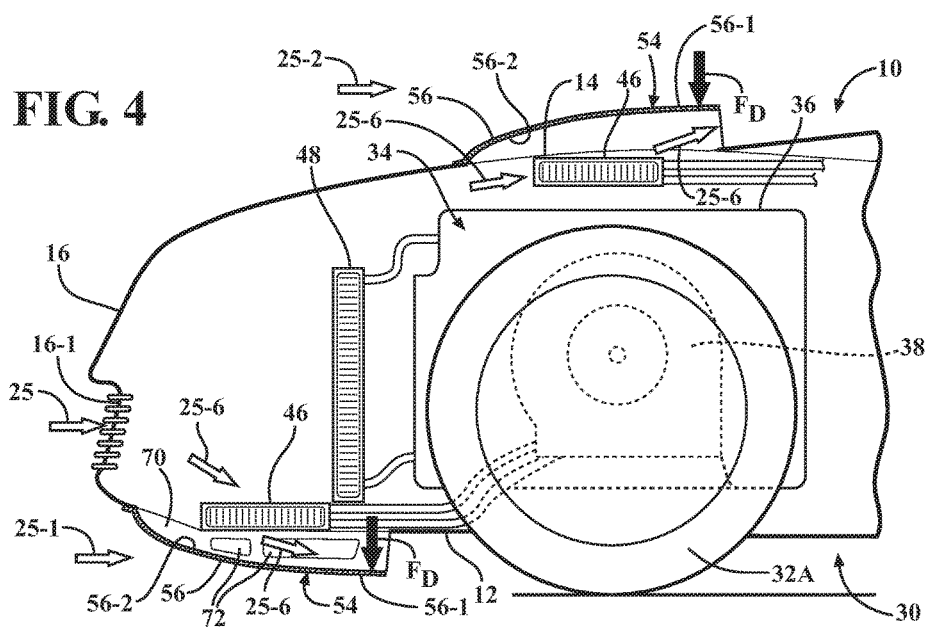
FIG. 4 is a schematic close-up partial side view of the vehicle depicting portions of ambient airflow directed by the airflow management cover and a resultant aerodynamic downforce acting on the vehicle according to the disclosure.

As shown in FIG. 1, the top body section 24 is configured to span a distance 28 between the front and rear ends 16, 18 of the body 14. Although not specifically identified in the Figures, as understood by those skilled in the art, the top body section 24 frequently includes such components as a vehicle roof, a hood or bonnet, and a trunk lid. As shown in FIG. 1, the underbody section 26 is also configured to span the distance 28 between the front and rear ends 16, 18 of the body 14. The underbody section 26 may have a profile configured, such as shaped or formed, to accommodate components of various vehicle subsystems that will be discussed in greater detail below. The underbody section 26 also defines a space 30 between the vehicle body 14 and the road surface 12 (as shown in FIG. 4). Accordingly, the space 30 permits an underbody airflow portion 25-1 to pass under the vehicle body 14, between the vehicle body 14 and the road surface 12, while a top airflow portion 25-2 passes over the top body section 24. Additionally, a left airflow portion 25-3 passes around the left side 20 and a right airflow portion 25-4 passes around the right side 22. Accordingly, each of the airflow portions 25-1, 25-2, 25-3, and 25-4 is considered to be an external airflow portion with respect to the vehicle body 14.

The external airflow portions 25-1, 25-2, 25-3, and 25-4 all rejoin behind the rear end 18 in a wake area or recirculating airflow region 25-5 immediately behind the rear end 18 of the moving vehicle. As understood by those skilled in the art, the recirculating airflow region 25-5 is generally caused at elevated vehicle speeds by the flow of surrounding air around the body sides 18, 20, 22, 24, and 26. Also, a subsystem portion 25-6 of the oncoming ambient airflow 25 can enter the vehicle body 14 through specifically configured opening(s) either defined by the vehicle body or by panel(s) mounted thereto. For example, the subsystem portion 25-6 of the oncoming ambient airflow 25 can be received at the front end 16 through a specifically configured a grille opening 16-1. As used with respect to the present disclosure, the identifier "subsystem" in the term "subsystem portion 25-6" is intended to denote the portion of the oncoming ambient airflow 25 that passes over or through one or more subsystems, which will be described in detail below.

Figure 2:
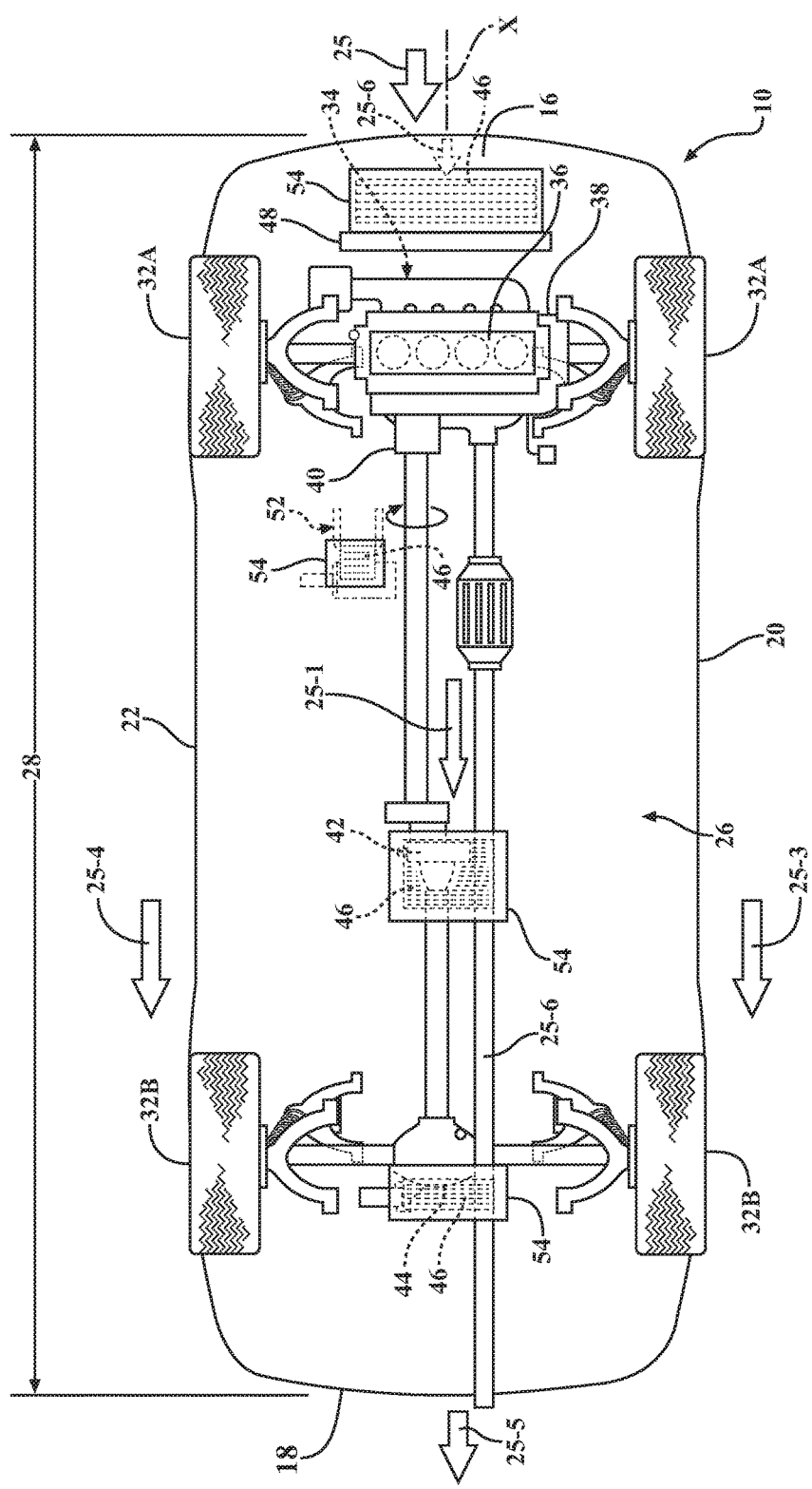
FIG. 2 is a schematic bottom view of the vehicle including a plan view of an airflow management cover arranged over a heat exchanger embodiment of the vehicle subsystem according to the disclosure.
Figure 3:
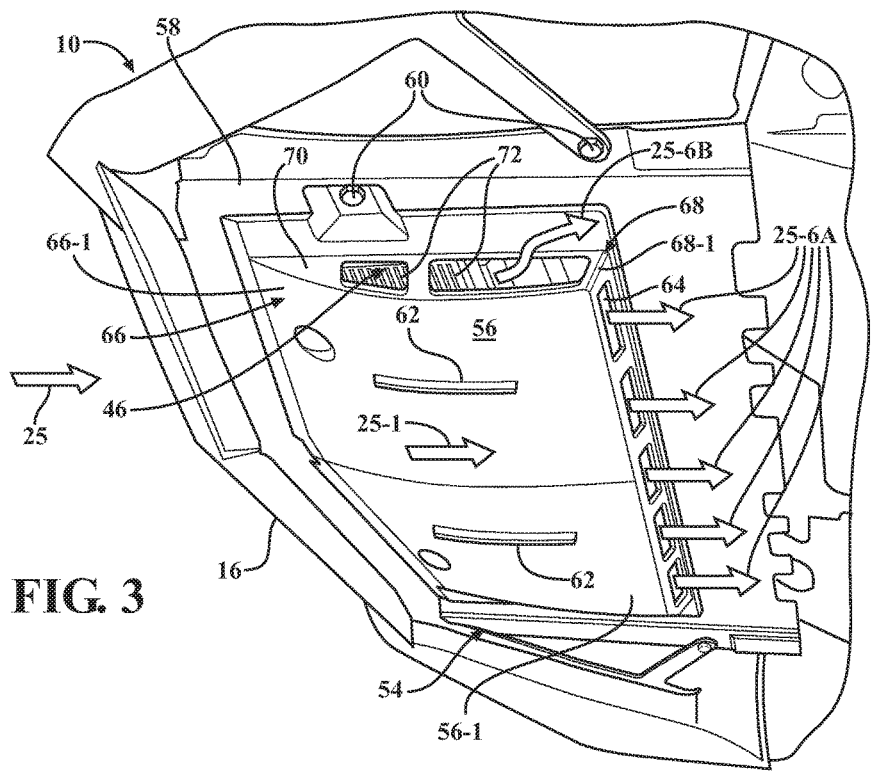
FIG. 3 is a schematic partial perspective bottom view of the vehicle depicting the airflow management cover arranged over the heat exchanger embodiment of the vehicle subsystem shown in FIG. 2 according to the disclosure.

With reference to FIGS. 1-3, the vehicle 10 includes a plurality of road wheels, specifically front wheels 32A and rear wheels 32B, and a powertrain 34 that may include an internal combustion engine 36 for generating engine torque. The powertrain 34 can also include a transmission 38 operatively connecting the engine 36 to at least some of the road wheels 32A, 32B for transmitting engine torque thereto. The powertrain 34 can additionally include a fuel cell (not shown) and/or one or more electric motor-generators 40, as shown in FIG. 2, operatively connected to at least some of the road wheels 32A and 32B and arranged inside the transmission 38 or external thereto. Additionally, the powertrain 34 can include a four-wheel-drive transfer case 42 (shown in FIG. 2) and a differential 44 (shown in FIGS. 1-4). In general, the engine 36, transmission 38, electric motor-generators 40, transfer case 42, and differential 44 are examples of vehicle subsystems that either generate heat as a byproduct of their operation and/or are heat-sensitive in a way that their performance and reliability stand to benefit from being cooled by the ambient airflow 25.

The vehicle 10 also includes heat exchanger(s) 46. Specific heat exchanger(s) 46 can be arranged proximate any of the vehicle body sections 20-26. As shown in FIGS. 2 and 3, the heat exchanger(s) 46 are arranged proximate the vehicle underbody section 26, while, as shown in FIG. 4, another heat exchanger 46 is arranged proximate the vehicle top body section 24. Each of such heat exchangers 46 can be configured as a fluid-to-air radiator to remove thermal energy from other vehicle subsystems, such as the engine 36, transmission 38, electric motor-generators 40, transfer case 42, and differential 44. Individual heat exchanger(s) 46 can also be used as part of other vehicle systems, such a heating, ventilation, and air conditioning (HVAC) system generally indicated at 52. As such, a particular heat exchanger 46 is a vehicle subsystem that can be configured to operate as part of a larger vehicle system, such as the HVAC 52, or to provide thermal management for another vehicle subsystem, such as any of the noted constituent mechanisms of the powertrain 34. Each of the representative vehicle subsystems can be arranged at or proximate the front end 16 or anywhere else along the underbody section 26 of the vehicle 10.

In general, in all the representative embodiments discussed above, the underbody airflow portion 25-1 may be used to remove heat energy from a particular vehicle subsystem, whether the subsystem is a specific heat exchanger 46 or a heat-generating mechanism. Accordingly, within the context of the present disclosure, the subject vehicle subsystem can be any heat generating mechanism, such as those of the powertrain 34, or a structure configured to participate in the transfer of heat energy, such as the heat exchanger(s) 46. Furthermore, the grille opening 16-1 in the front end 16 can be used to admit the subsystem portion 25-6 of the oncoming ambient airflow 25 such that, for example, the subsystem portion of the airflow can access any of the above-described heat-generating mechanisms directly or provide convective cooling thereof via the specific heat exchanger 46. Similarly, the subsystem portion 25-6 of the oncoming ambient airflow 25 can access a dedicated heat exchanger 46 through the grille opening 16-1 to control operation of the HVAC 52. In addition to various heat exchangers 46, the vehicle will commonly also employ a radiator 48 mounted to the vehicle body 14 for cooling the internal combustion engine 36.

As shown in FIGS. 2-4, the vehicle 10 also includes an airflow management cover 54 positioned at the underbody section 26 to guide the oncoming ambient airflow 25 relative to the vehicle. Additionally, as shown in FIG. 4, the vehicle 10 includes an embodiment of the airflow management cover 54 positioned at the top body section 24 to guide the oncoming ambient airflow 25 relative to the vehicle. The airflow management cover 54 is configured to shield a particular vehicle subsystem from road- or air-borne debris and guide a specific portion 25-1, 25-2, 25-3, or 25-4 when the vehicle 10 is in motion. Although the airflow management cover 54 can be positioned near, at, or on any of the vehicle body sections 20-26, for conciseness, the remainder of the disclosure will focus on the arrangement of the airflow management cover arranged on the underbody section 26.

Arranged on the underbody section 26, the airflow management cover 54 is configured to shield a particular vehicle subsystem from road- or air-borne debris primarily carried by the underbody airflow portion 25-1. As shown in FIGS. 2-4, the airflow management cover 54 includes a convex body 56 has an exterior surface 56-1 shaped to redirect and manage the underbody airflow portion 25-1 around the particular vehicle subsystem to thereby minimize aerodynamic drag. Within the context of the present disclosure, the descriptor "convex" for the airflow management cover body 56 describes a shape that is bowed, curved, or turned out from the underbody section 26 to thereby extend into the space 30 between the vehicle body 14 and the road surface 12.

Furthermore, the exterior surface 56-1 of the convex body 56 can be shaped in profile as an airfoil to take advantage of the subject shape's aerodynamic signature and efficiently direct the underbody airflow portion 25-1 around the particular vehicle subsystem. The convex body 56, especially one having the airfoil shape, is additionally configured to reduce aerodynamic lift acting on the vehicle body 14 and generate a measure of aerodynamic downforce $F_D$ thereon when the vehicle 10 is in motion, as shown in FIG. 4. As used herein, the term "aerodynamic downforce" is defined as an aerodynamic force acting on the vehicle 10 in a downward, normal direction relative to the road surface 12. As such the aerodynamic downforce $F_D$ is a negative lift force acting on the vehicle body 14 when the vehicle 10 is in motion.

The convex body 56 has an interior surface 56-2 configured to receive the subsystem airflow portion 25-6 aft of the particular vehicle subsystem. The interior surface 56-2 is configured, i.e., shaped, to facilitate efficient management of the subsystem airflow portion 25-6 through the particular subsystem, such as a specific heat exchanger 46 or a heat-generating mechanism. Specifically, the interior surface 56-2 can be shaped to promote smooth and unobstructed passage of the subsystem airflow portion 25-6 aft of the particular subsystem. After having passed across the particular vehicle subsystem, the subsystem airflow portion 25-6 can be separated into distinct first stream 25-6A and second stream 25-6B prior to being rejoined with the vehicle underbody airflow portion 25-1, as will be discussed in detail below.

The airflow management cover 54 also includes a fastening flange 58 extending outwardly from the convex body 56. The fastening flange 58 is configured, i.e., arranged, shaped, and constructed, to accept a plurality of fastening devices 60, such as brackets, screws, and/or clips, for fixedly mounting the airflow management cover 54 to the vehicle underbody section 26. A specific embodiment of the airflow management cover 54 can be mounted proximate the front end 16 or anywhere else along the underbody section 26 of the vehicle 10 to direct the underbody airflow portion 25-1 and the subsystem airflow portion 25-6 relative to the particular vehicle subsystem.

Each of the convex body 56 and the fastening flange 58 can be constructed from a polymeric, such as a thermoplastic, material. Furthermore, the convex body 56 and the fastening flange 58 can form a single, continuous structure, i.e., one that is not assembled from separate components. Additionally, the convex body 56 can include one or more structural ribs 62 configured to enhance rigidity of the airflow management cover 54. The ribs 62 can be molded into the convex body 56 and configured to extend into the fastening flange 58 to generate additional stiffening of the airflow management cover 54 structure. The ribs 62 can be aligned with the path of the underbody airflow portion 25-1 to streamline the airflow substantially in line with the axis X along the exterior surface 56-1.

The airflow management cover 54 also includes one or more first apertures 64 defined by the convex body 56. The first aperture(s) 64 are configured to exhaust the first stream 25-6A of the subsystem airflow portion 25-6 that has passed across, such as over or through, the vehicle subsystem to remove heat energy therefrom. Once exited from the first aperture(s) 64, the first stream 25-6A will be rejoined in the space 30 with the redirected vehicle underbody airflow portion 25-1. The exterior surface 56-1 of the convex body 56 can include a leading section 66 having a ramp 66-1 configured to face the underbody airflow portion 25-1. The exterior surface 56-1 of the convex body 56 can also include a trailing section 68 having a step 68-1 arranged orthogonal to the vehicle underbody airflow portion 25-1 that has been redirected around a specific vehicle subsystem.

As shown in FIGS. 3 and 4, the convex body 56 may additionally include side sections 70 arranged along the underbody airflow portion 25-1. Each of the side sections 70 can define one or more second apertures 72 configured to exhaust the second stream 25-6B of the subsystem airflow portion 25-6 that has previously passed across the vehicle subsystem to remove heat energy therefrom. The second stream 25-6B of the subsystem airflow portion 25-6 exhausted by the second aperture(s) 72 would subsequently rejoin the redirected underbody airflow portion 25-1, along with the first stream 25-6A from the first aperture(s) 64, in the space 30 to reduce aerodynamic lift and generate a measure of aerodynamic downforce $F_D$ on the vehicle body 14.

Overall, the airflow management cover 54 enhances efficiency of the subsystem airflow portion 25-6 for cooling and ventilation of critical vehicle subsystems while redirecting and streamlining the particular airflow portion 25-1, 25-2, 25-3, or 25-4 relative to the vehicle body 14 when the vehicle 10 is in motion. Thus configured to direct and streamline various portions of the oncoming ambient airflow 25 through the vehicle 10 and around any of the vehicle body sections 20-26, the airflow management cover 54 can provide enhanced aerodynamic characteristics for the vehicle 10 for improved energy efficiency and reduced noise at elevated road speeds.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a vehicle body configured to face an oncoming ambient airflow and including a first vehicle body end, a second vehicle body end opposite of the first vehicle body end, and a vehicle section configured to span a distance between the first and second vehicle body ends and receive an external portion of the oncoming ambient airflow when the vehicle is in motion;

a vehicle subsystem arranged proximate the vehicle section, wherein a subsystem portion of the oncoming ambient airflow passes across the vehicle subsystem;

an airflow management cover configured to guide the external portion of the oncoming ambient airflow and the subsystem portion of the oncoming ambient airflow, including:

a convex body having an exterior surface shaped to redirect the external portion of the oncoming ambient airflow around the vehicle subsystem to thereby minimize aerodynamic drag and reduce aerodynamic lift on the vehicle body;

at least one first aperture defined by the convex body and configured to exhaust a first stream of a subsystem portion of the oncoming ambient airflow to rejoin with the redirected external portion of the oncoming airflow after the subsystem portion of the oncoming ambient airflow has passed across the vehicle subsystem; and a fastening flange extending from the convex body and fixed to the vehicle section wherein the exterior surface of the convex body includes a side section arranged along the external portion of the oncoming airflow, and the side section defines at least one second aperture configured to exhaust a second stream of the subsystem portion of the oncoming airflow after the subsystem portion of the oncoming ambient airflow has passed across the vehicle subsystem.

2. The vehicle of claim 1, wherein the exterior surface of the convex body includes a leading section configured to face the external portion of the oncoming airflow and a trailing section having a step arranged orthogonal to the redirected external portion of the oncoming airflow.

3. The vehicle of claim 1, wherein the at least one first aperture includes a plurality of first apertures.

4. The vehicle of claim 1, wherein the at least one second aperture includes a plurality of second apertures.

5. The vehicle of claim 1, wherein the vehicle subsystem is a vehicle heat exchanger.

6. The vehicle of claim 1, wherein each of the convex body and the fastening flange is constructed from a polymeric material.

7. The vehicle of claim 1, wherein the convex body and the fastening flange form a single, continuous structure.

8. The vehicle of claim 7, wherein the convex body includes a structural rib configured to enhance rigidity of the cover.

9. The vehicle of claim 1, wherein the vehicle subsystem is arranged at the first vehicle body end.

10. The vehicle of claim 1, wherein the vehicle includes a grille opening arranged at the first vehicle body end and configured to receive the subsystem portion of the oncoming ambient airflow.

* * * * *